(12) United States Patent
Okumura et al.

(10) Patent No.: US 6,625,178 B1
(45) Date of Patent: Sep. 23, 2003

(54) VIRTUAL PRIVATE LINE CONTROL SYSTEM WITH IMPROVED TRANSMISSION EFFICIENCY

(75) Inventors: Takashi Okumura, Tokyo (JP); Makoto Hokari, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/185,459

(22) Filed: Nov. 3, 1998

(30) Foreign Application Priority Data

Nov. 12, 1997 (JP) .............................. 9-310658

(51) Int. Cl.⁷ .................................. H04J 3/16
(52) U.S. Cl. ....................... 370/524; 370/522
(58) Field of Search ................. 370/229, 230, 370/252, 396, 397, 398, 399, 395.2, 395.21, 395.61, 409, 419, 420, 522, 904, 524, 465, 468, 351, 352, 389, 401; 379/224, 225, 231, 232, 233, 234

(56) References Cited

U.S. PATENT DOCUMENTS

| | | | | |
|---|---|---|---|---|
| 5,212,691 A | * | 5/1993 | Hokari | 370/384 |
| 5,422,943 A | * | 6/1995 | Cooney et al. | 370/385 |
| 5,469,502 A | * | 11/1995 | Matsumoto | 370/358 |
| 5,475,744 A | * | 12/1995 | Ikeda | 379/127.01 |
| 5,481,605 A | | 1/1996 | Sakurai et al. | |
| 5,587,999 A | * | 12/1996 | Endo | 370/352 |
| 5,592,473 A | | 1/1997 | Matern et al. | |
| 5,764,750 A | * | 6/1998 | Chau et al. | 370/467 |
| 5,818,921 A | * | 10/1998 | Vander Meiden et al. | 370/385 |

FOREIGN PATENT DOCUMENTS

| | | |
|---|---|---|
| JP | 58-21992 | 2/1983 |
| JP | 59-127458 | 7/1984 |
| JP | 1-120950 | 5/1989 |
| JP | 3-125551 | 5/1991 |
| JP | 4-20060 | 1/1992 |
| JP | 4-165892 | 6/1992 |
| JP | 5-244250 | 9/1993 |
| JP | 6-181474 | 6/1994 |
| JP | 09-233090 | 9/1997 |
| JP | 9-266509 | 10/1997 |

OTHER PUBLICATIONS

Japanese Office Action issued Jul. 11, 2000 in a related application with English translation of relevant portions.

\* cited by examiner

Primary Examiner—Dang Ton
(74) Attorney, Agent, or Firm—Dickstein, Shapiro, Morin & Oshinsky, LLP.

(57) ABSTRACT

In a private branch exchanger which is connected to an ISDN network, a virtual private line information table stores information indicating channels corresponding to virtual private lines in units of routes. An identifying unit determines a route in response to an event, refers to the virtual private line information table based on the determined route to determine a specific one of the channels corresponding to the virtual private lines for the determined route. Also, the identifying unit determines whether a connection of a specific virtual private line corresponding to the specific channel to an ISDN network is established. When the specific channel corresponding to a specific virtual private line is usable, the identifying unit issues a communication instruction. A communication unit performs communication using the specific channel corresponding to the specific virtual private line in response to the communication instruction.

12 Claims, 6 Drawing Sheets

Fig. 3

| CHANNEL NO. | VIRTUAL PRIVATE LINE STATE DATA | COMMUNICATION STATE DATA | CHANNEL CAPTURE REMAINING TIME DATA | COMMUNICATION CHANNEL CAPTURE TIME DATA |
|---|---|---|---|---|
| ch23 | CONNECTION | COMMUNICATION | NOT SET | 1 MIN. |
| ch22 | CONNECTION | EMPTY | 30 SEC. | 1 MIN. |
| ch21 | DISCONNECTION | NOT SET | NOT SET | 1 MIN. |
| | | | | |
| | | | | |

12-3a, 12-3b, 12-3c, 12-3d 12-3 VIRTUAL PRIVATE LINE CONNECTION DATA

VIRTUAL PRIVATE LINE CONTROL SYSTEM WITH IMPROVED TRANSMISSION EFFICIENCY

BACKGROUND OF THE INVENTION

1. Field of the Invention

The present invention relates to a virtual private line control system, and more particularly to the technique for connecting and disconnecting a virtual private line using an ISDN network between private branch exchangers which have ISDN interfaces.

2. Description of the Related Art

Generally, the traffic of a telephone network changes depending upon the time zone and the day of the week. For example, in case of a telephone network system of an enterprise, the heaviest traffic tends to be during the beginning of the workday, immediately after noon, and immediately before the end of the workday. Thus, the heaviest traffic only occurs during several hours in a day.

A telephone network of an enterprise connects between the head office and each of offices, between the offices, between the head office and each of business stations, and between the business stations by private lines. Considering the high traffic hours, the enterprise contracts many telephone lines with a communication company. Therefore, some of the telephone lines are not used other than the high traffic hours. As a result, the line use efficiency decreases and the enterprise has to pay a telephone line use fee.

In order to eliminate the excessive number of private telephone lines and the excessive telephone line use fee, a virtual private line system which uses an ISDN network is proposed in Japanese Laid Open Patent Application (JP-A-Heisei 4-165892). In this reference, the number of private lines is made minimum, and virtual private lines using the ISDN network are set only for a high traffic time zone so as to increase the number of lines.

The virtual private line system adopts a time link system. In the time link system, virtual private line information is previously registered in a storage unit on the side of a station. The virtual private line information is composed of a time bit map in which the number of virtual private lines to be set with respect to route information, the number of channels, a call arrival number, a call origination number and a time zone are registered for every day and for every route. The station on the call originating side periodically searches the storage unit to read the registered virtual private line information for a present day. Then, the station refers to the time bit map to perform the setting or cancellation of the virtual private lines for a present time zone.

As described above, the conventional virtual private line system which uses the ISDN network adopts the time link system. An expected traffic is considered, and the number of virtual private lines, a connection start time of each of the virtual private lines, and a time interval are previously set in a station data. The connection of the virtual private line is realized in accordance with the station data. For this reason, even if there is not generation of any event such as a call origination at all when the virtual private line information is periodically referred to, the connecting process of the virtual private lines is performed for the number of virtual private lines set in the time zone of the time bit map. Therefore, the conventional virtual private line system is effective when the actual traffic at that time is equal to or near to the expected traffic. However, if the actual traffic at that time is lower than the expected traffic, excessive virtual private lines are connected. As a result, the improvement of the decrease of the line use efficiency and the improvement of payment of the telephone line use fee are not always enough.

Also, when events more than the expected traffic are generated, the lack of the virtual private lines occurs to cause a communication loss.

In addition the above reference, a variable communication network is described in Japanese Laid Open Patent Application (JP-A-Showa 59-127458). In this reference, a first exchanger and a second exchanger are directly connected by a first line. The first and second exchangers are connected by a second line group via one or more other exchangers. The first exchanger and each of the exchangers of a network includes a line selecting circuit for selecting an optional one of the second line group as a virtual fixed connection line. A flag field for indicating the second line group is captured for the virtual fixed connection line is provided in a signal format of a signal system between the first exchanger and each exchanger of the network. When the second line group is captured, it is set in the flag field. Thus, an optional line is captured as the virtual fixed connection line and the number of virtual fixed connection lines is adjusted based on the traffic on the first line.

A virtual private line connecting system is described in Japanese Laid Open Patent Application (JP-A-Heisei 3-125551). In this reference, private branch exchangers are connected via an ISDN network. A D channel signal circuit and a PBX—PBX common line signal circuit are connected to a D channel and a plurality of B channels on a user and network interface. Links by a plurality of B channels or H0 channels are formed in the ISDN network by the D channel signal circuit. One of the plurality of B channels is connected to the PBX—PBX common line signal circuit for a virtual private line.

In addition, a virtual private line connecting system is described in Japanese Laid Open Patent Application (JP-A-Heisei 5-244250). In this reference, a call is originated from a terminal 1 to a terminal 16. When a private trunk 1 line 3 is in a communication state, an empty channel is selected and a call origination event is notified to a central control unit 8 for establishment of a virtual private lie. The central control unit 8 originates a call to an ISDN network 17 using one of numbers registered in a main storage unit 18. In a call arriving station, a central control unit 14 performs a call arriving process to a compressed speech trunk 12 which automatically responds to the ISDN network 17 via a first interface group circuit 10. The central control unit 8 connects a communication path switch of a compressed speech trunk 6 via a first interface group circuit 4. As a result, a virtual private line is established through the ISDN network 17.

Also, a communication control apparatus is described in Japanese Laid Open Patent Application (JP-A-Heisei 6-181474). In this reference, when determining that a data transmission amount of an information processing apparatus par a unit time which is detected by a traffic detecting section 23 exceeds an upper limit of allowable range of data transmission amount at present, a traffic determining section 25 notifies to a packet exchange control section 24, an instruction for adding one virtual line to the same recipient. The packet exchange control section 24 sets another new virtual line between the information processing apparatus and the above recipient on an INS-P. Thereafter, the information processing apparatus performs a packet communication using the two virtual lines.

SUMMARY OF THE INVENTION

The present invention is accomplished in view of the above problems. Therefore, an object of the present invention is to provide a virtual private line control system and a method for the same, in which the connection and disconnection of a virtual private line using an ISDN network are performed in response to generation of an event such as a call origination, in a private branch exchanger which has an ISDN interface.

In order to achieve an aspect of the present invention, a private branch exchanger which is connected to an ISDN network, includes an identifying unit for identifying a specific one of a plurality of virtual private lines in response to an event, for determining whether the specific virtual private line is usable, and for issuing a communication instruction when the specific virtual private line is usable. A communication unit performs communication using a specific channel corresponding to the specific virtual private line in response to the communication instruction.

The private branch exchanger may be connected to a first terminal, and the event may be a call origination from the first terminal to a second terminal connected to another private branch exchanger which is connected to an ISDN network.

The identifying unit issues a connection instruction when a connection of the specific virtual private line to an ISDN network is not established. The private branch exchanger further comprises a connection control unit for establishing the connection of the specific virtual private line to the ISDN network in response to the connection instruction.

The connection control unit holds the specific virtual private line in a connected state for a predetermined time after the communication. In this case, the connection control unit disconnects the specific virtual private line after the predetermined time when an even using the specific virtual private line is not generated for the predetermined time.

The private branch exchanger may further include a monitoring unit monitors determines whether or not the predetermined time elapses after the communication.

In order to achieve another aspect of the present invention, a private branch exchanger which is connected to an ISDN network, includes a virtual private line information table which stores information indicating channels corresponding to virtual private lines in units of routes, an identifying unit for determining a route in response to an event, for referring to the virtual private line information table based on the determined route to determine a specific one of the channels corresponding to the virtual private lines for the determined route, for determining whether a connection of a specific virtual private line corresponding to the specific channel to an ISDN network is established, and for issuing a communication instruction when the specific channel corresponding to the specific virtual private line is usable, and a communication unit for performing communication using the specific channel corresponding to the specific virtual private line in response to the communication instruction.

The private branch exchanger may further include a virtual private line connection information table which stores connection state information indicating whether each of the plurality of virtual private lines is in a connected state or in a disconnected state, and communication state information indicating whether a channel corresponding to each of the plurality of virtual private lines is in an empty state or a communication state. In this case, the identifying unit refers to the virtual private line connection information table based on the channels corresponding to the virtual private lines for the determined route to determine whether the connection state information of each of the virtual private lines for the determined route is the connected state or the disconnected state. As a result, the identifying unit issues the communication instruction when at least one of the channels of the virtual private lines for the determined route as the specific channel has the communication state information of the empty state. Also, the identifying unit changes the communication state information for the specific channel from the empty state to the communication state.

In addition, the identifying unit issues a connection instruction, when all of the channels corresponding to some of the virtual private lines for the determined rout have the communication state information of the communication state while ones of the virtual private lines for the determined route other than the some virtual private lines have the connection state information of the disconnected state. The private branch exchanger further comprises a connection control unit for establishing the connection of one of the virtual private lines for the determined route as the specific virtual private line which has the connection state information of the disconnected state, in response to the connection instruction. The connection control unit changes the connection state information for the specific virtual private line to the connected state, and the communication state information for the specific channel corresponding to the specific virtual private line to the communication state.

The private branch exchanger may further include a monitoring unit for monitoring the channels of the virtual private lines, for changing the communication state information of the specific channel to the empty state when the communication is ended.

The virtual private line connection information table further includes a line capture time setting information indicating a time for which each of the virtual private lines should be captured after the communication is ended, and a remaining capture time information indicating a time for which the each virtual private line should be remained in a captured state. At that time, the monitoring unit sets the line capture time setting information to the remaining capture time information when the communication is ended. Also, the monitoring unit monitors the channels of the virtual private lines for every predetermined time, and updates the remaining capture time information for every channel based on the monitoring result. In addition, the monitoring unit issues a disconnection instruction when one of the virtual private lines has the remaining capture time information of 0. In this case, the connection control unit disconnects the one virtual private line having the remaining capture time information of 0.

In order to achieve still another aspect of the present invention, a method of using an ISDN network for a virtual private line, includes the steps of:

determining a route in response to an event;

referring to a virtual private line information table based on the determined route to determine the channels corresponding to the virtual private lines for the determined route the virtual private line information table storing information indicating channels corresponding to virtual private lines in units of routes;

determining a usable specific one of the channels;

issuing a communication instruction when the specific channel is determined; and performing communication using the specific channel corresponding to the specific virtual private line in response to the communication instruction.

In this case, in order to determine a specific channel, a virtual private line connection information table is referred to based on the channels corresponding to the virtual private lines for the determined route to determine whether the connection state information of each of the virtual private lines for the determined route is the connected state or the disconnected state. The virtual private line connection information table stores connection state information indicating whether each of the plurality of virtual private lines is in a connected state or in a disconnected state, and communication state information indicating whether a channel corresponding to each of the plurality of virtual private lines is in an empty state or a communication state. As the specific channel, one of the channels having the connection state information of the connected state and having the communication state information of the empty state is determined. Also, the communication state information for the specific channel is changed from the empty state to the communication state.

The method may further includes the steps of:

issuing a connection instruction, when all of the channels corresponding to some of the virtual private lines for the determined rout have the communication state information of the communication state while ones of the virtual private lines for the determined route other than the some virtual private lines have the connection state information of the disconnected state;

establishing the connection of one of the virtual private lines for the determined route as the specific virtual private line which has the connection state information of the disconnected state, in response to the connection instruction; and changing the connection state information to the connected state.

Also, the method may further includes the steps of:

monitoring the channels of the virtual private lines; and changing the communication state information of the specific channel to the empty state when the communication is ended.

The virtual private line connection information table further includes a line capture time setting information indicating a time for which each of the virtual private lines should be captured after the communication is ended, and a remaining capture time information indicating a time for which the each virtual private line should be remained in a captured state. In this case, wherein the monitoring step includes setting the line capture time setting information to the remaining capture time information when the communication is ended.

Also, the monitoring step includes:

monitoring the channels of the virtual private lines for every predetermined time; and updating the remaining capture time information for every channel based on the monitoring result.

In addition, the method may further include the steps of:

issuing a disconnection instruction when one of the virtual private lines has the remaining capture time information of 0; and disconnecting the one virtual private line having the remaining capture time information of 0.

BRIEF DESCRIPTION OF THE DRAWINGS

FIG. 3 is a diagram illustrating the detail of a virtual private line connection information in the virtual private line information memory according to the embodiment of the present invention;

DESCRIPTION OF THE PREFERRED EMBODIMENTS

Next, the virtual private line control system of the present invention will be described with reference to the attached drawings.

Figure 1:
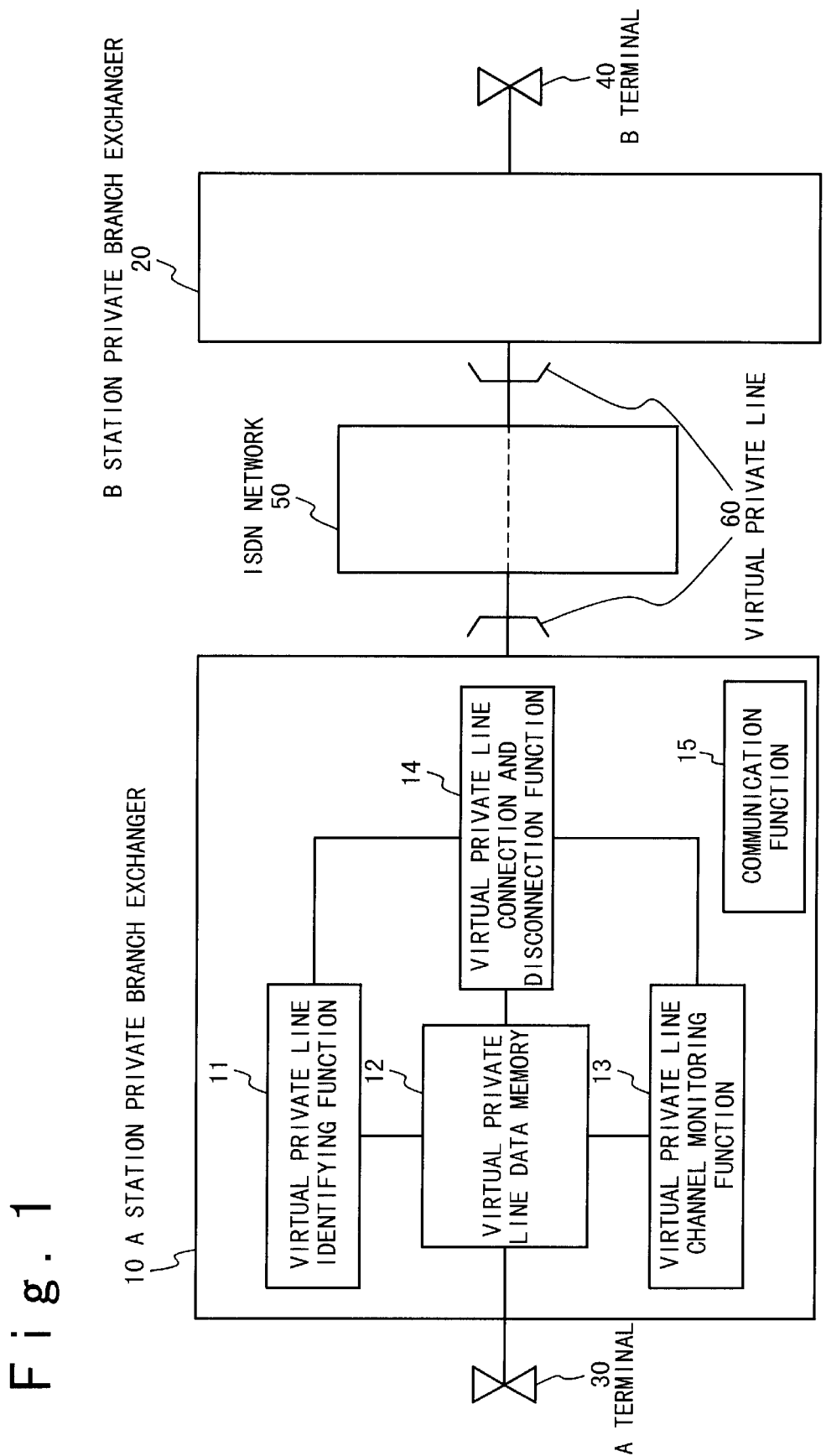
FIG. 1 is a block diagram illustrating the structure example of a virtual private line control system according to an embodiment of the present invention.

FIG. 1 is a block diagram illustrating the main structure of the virtual private line control system according to the embodiment of the present invention.

Referring to FIG. 1, the embodiment of the present invention is composed of an A station private branch exchanger 10, an A terminal 30 which is accommodated in the A station private branch exchanger, a B station private branch exchanger 20, a B terminal 40 which is accommodated in the B station private branch exchanger, a virtual private line 60 as an ISDN line which connects the A station private branch exchanger and the B station private branch exchanger, via the ISDN network 50.

The A station private branch exchanger 10 is composed of a virtual private line identifying function 11 as the function to control the connection of the virtual private line 60 when an event such as a call origination is generated, a virtual private line information memory 12 in which virtual private line information used to connect the private lines is previously registered, a virtual private line channel monitoring function 13, a virtual private line connecting and disconnecting function 14, and a communication function 15. The B station private branch exchanger 20 also has the same structure as the A station private branch exchanger 10, although that of the B station private branch exchanger 20 is not illustrated.

The A station private branch exchanger 10 and the B station private branch exchanger 20 are connected via the ISDN network 50 by the ISDN lines. Each of the private branch exchangers functions as a counter virtual private line station, and the ISDN line functions as the virtual private line 60.

The virtual private line information memory 12 stores a route which corresponds to a dial number, a usable communication channel in the virtual private line, and a virtual private line connection information. The virtual private line identifying function 11 determines whether or not a generated event is a station line call origination which needs the connection of the virtual private line.

The virtual private line channel monitoring function 13 periodically monitors the virtual private line connection information of the virtual private line information memory 12. The virtual private line connecting and disconnecting function 14 receives the control of the virtual private line channel monitoring function 13 and virtual private line identifying function 11 to perform the connection and disconnection of the virtual private line. Also, the communication function 15 performs communication via a usable channel in the virtual private line using an ISDN interface. It should be noted that the ISDN interface is provided for the A station private branch exchanger 10, although it is not shown.

Figure 2:
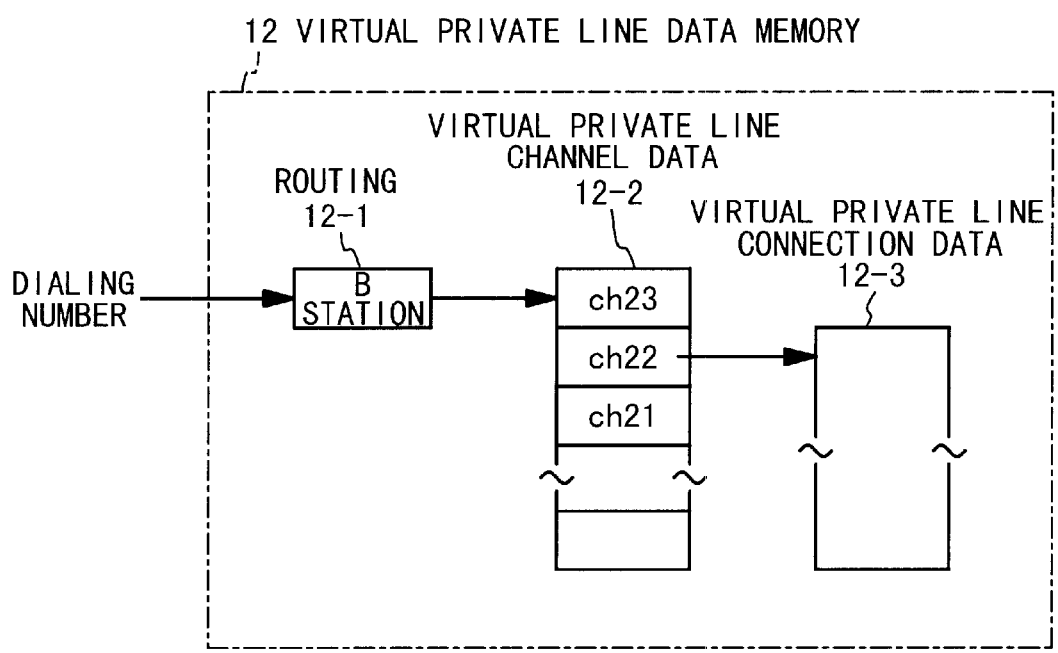
FIG. 2 is a diagram illustrating the structure example of a virtual private line information memory according to the embodiment of the present invention.

FIG. 2 is a diagram illustrating an example of virtual private line information of the virtual private line information memory 12, and FIG. 3 is a diagram illustrating the detail of the virtual private line connection information in the virtual private line information memory 12.

As shown in FIG. 2, the virtual private line information memory 12 is composed of a virtual private line channel information 12-2 in which usable communication channels of a primary interface (23B+D) are set in units of routes 12-1, and virtual private line connection information 12-3 in which state information of each of the communication channels is set which are set in the virtual private line channel information 12-2. In this example, channels 21, 22 and 23 are designated as the usable communication channels (hereinafter, to be referred as channels) for the route to B station.

FIG. 3 is a diagram illustrating the detail of the virtual private line connection information of the virtual private line information memory 12. The virtual private line connection information 12-3 is composed of virtual private line state information 12-3a, communication state information 12-3b, communication channel capture time information 12-3d, and channel capture remaining time information 12-3c. The virtual private line state information 12-3a indicates the connection state of the virtual private line. The communication state information 12-3b indicates a communication state. The communication channel capture time information 12-3d after communication end indicates the time for which a channel continues to be captured after the communication end. The communication channel capture time information 12-3d after communication end is previously set as an initial value. The channel capture remaining time information 12-3c indicates the remaining time of the channel capture time after the communication end. These types of information correspondence to each of the usable channels 21, 22 and 23.

Referring to FIG. 3, it is shown that the communication using the channel 22 ends and 30 seconds lapses but the virtual private line will be still connected for 30 seconds. Since the communication channel 23 is in a communication state at present, the channel capture remaining time information is not displayed as a subtraction result (setting). Also, as for the channel 21, communication using the channel 21 is ended, the channel capture remaining time is ended so that the virtual private line is disconnected.

Figure 4:
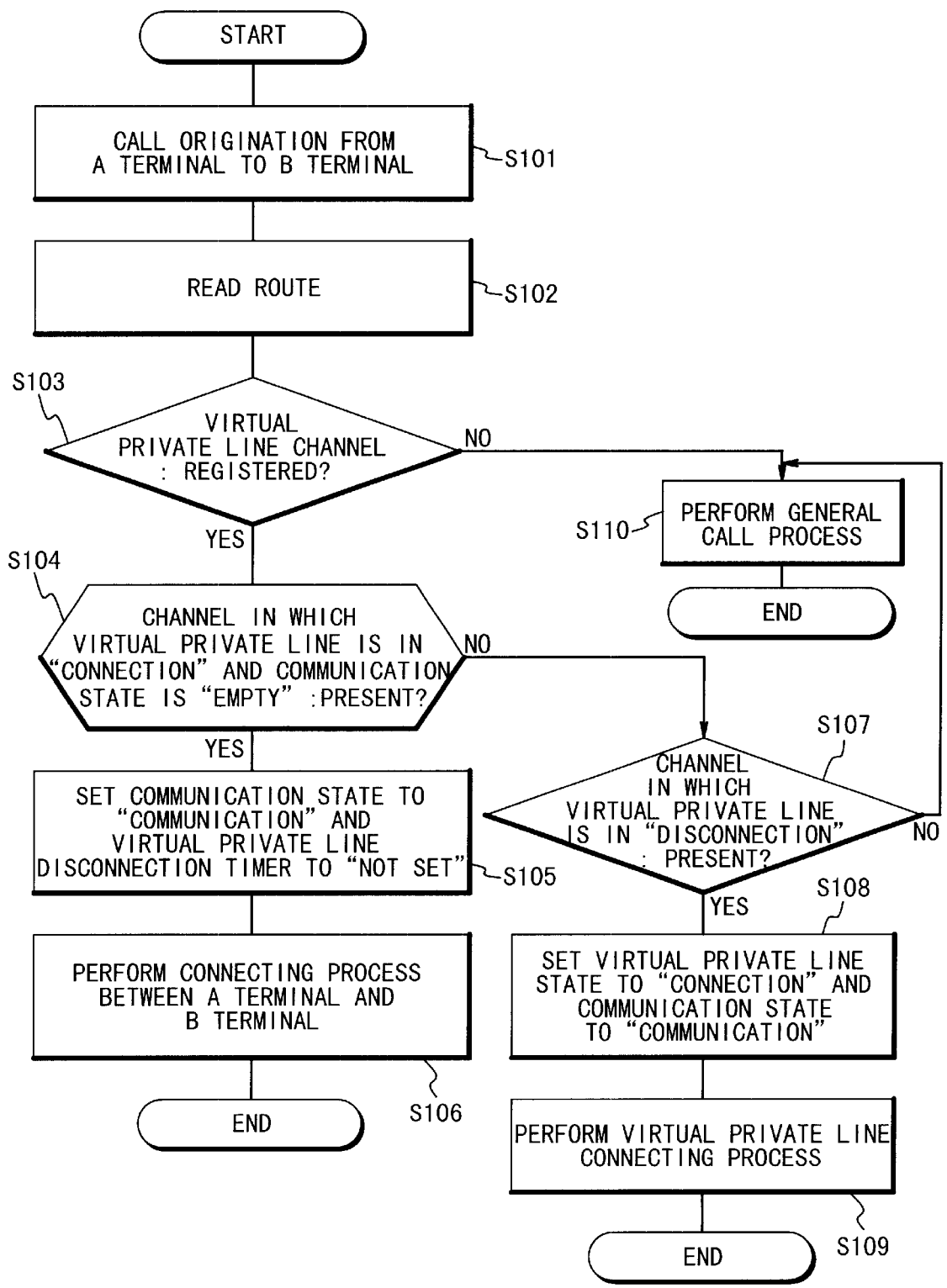
FIG. 4 is a flow chart illustrating a virtual private line connection procedure in the virtual private line control system according to the embodiment of the present invention.

Next, the connecting operation of the virtual private line will be described with reference to FIG. 4 in addition to FIG. 1, FIG. 2 and FIG. 3. FIG. 4 is a flow chart illustrating the connection procedure of the virtual private line of the present invention. It should be noted that the case where a call is originated from the A terminal 30 to the B terminal 40 will be described as an example.

A call is originated from the A terminal 30 to the B terminal 40 (step S101 of FIG. 4). The A station private branch exchanger 10 detects a telephone number (a dial number) of the B terminal 40 from call origination information which has been sent out from the A terminal 30 by a well known method, to notify to the virtual private line identifying function 11.

The virtual private line identifying function 11 refers to the virtual private line information memory 12 based on the telephone number to read out the route 12-1 to the B station (S102). Subsequently, the virtual private line identifying function 11 refers to the virtual private line channel information 12-2 based on the read out route to the B station, and detects existence or non-existence of the registration of any virtual private lines to the route to the B station (S103).

As shown in FIG. 2, the channels 21, 22 and 23 are registered in the virtual private line channel information 12-2 of the virtual private line information memory 12. Therefore, the virtual private line identifying function 11 refers to the virtual private line connection information 12-3 to detect existence or non-existence of any channel which has the virtual private line state information 12-3b of the "connected state" and the communication state information 12-3a of the "empty state" (S104).

As shown in FIG. 3, there is the channel 22 which has the virtual private line state information 12-3a of the "connected state" and the communication state information 12-3b of the "empty state". Therefore, the virtual private line identifying function 11 updates the communication state information 12-3b from the "empty state" to a "communicating state". Also, the channel capture remaining time information 12-3c is updated from "30 seconds" to the "no setting" (S105). The virtual private line identifying function 11 issues an instruction to the virtual private line connecting and disconnecting function 14 such that the channel in the captured state at present continues to be used. Then, the process of connecting the A terminal 30 and the B terminal 40 is performed between the A station private branch exchanger and the B station private branch exchanger using the channel 22 (S106). After that, the virtual private line identifying function 11 issues a communication start instruction to the communication function 15. Thus, the communication is started between the A terminal 30 and the B terminal 40.

In this way, when the virtual private line is already connected between the private branch exchangers and there is a channel in the empty state, the communication efficiency can be increased when the traffic is high. This is because the connecting process of the virtual private line becomes unnecessary.

In the S104 step, when there is not a channel which has the virtual private line state information 12-3a of the "connected state" and the communication state information 12-3b of the "empty state", existence or non-existence of a channel which has the virtual private line state information 12-3 of the "disconnected state" is detected (S107).

Because there is the channel 21 which has the virtual private line state information 12-3a of the "disconnected state", the virtual private line identifying function 11 issues a new connection instruction to the virtual private line connecting and disconnecting function 14 such that a connection of the new channel 21 is established. The virtual private line connecting and disconnecting function 14 reads the virtual private line connection information 12-3 from the virtual private line information memory 12 in response to the new connection instruction and updates the virtual private line state information 12-3a to the "connected state" and the communication state information to the "communicating state" as for the channel 21 (S108). Then, the virtual private line connecting and disconnecting function 14 executes the connecting process of the channel 21 (S109).

When the connection is completed, the virtual private line identifying function 11 issues the communication state instruction to the communication function 15. After that, communication is started.

When it is determined in the step S103 that there is not any registered channel of the virtual private line, and when it is determined in the step S104 that there is not a channel in the "disconnected state", communicating process is performed using a line other than the virtual private line (for example, another ISDN line) (S110).

In this way, the virtual private line is not wastefully connected when there is not any event such as a call origination. Therefore, the line efficiency can be improved when the traffic is low.

Figure 5:
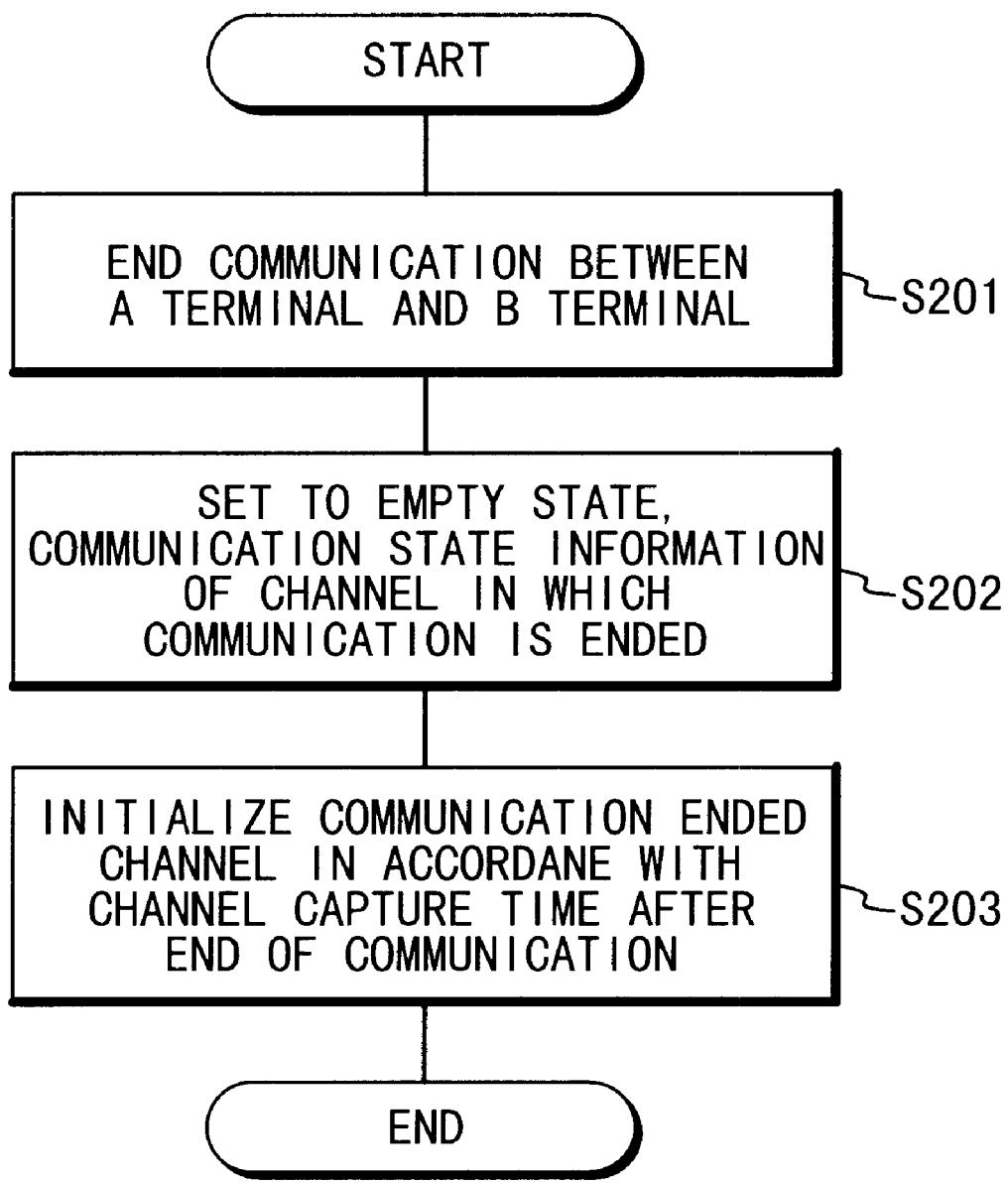
FIG. 5 is a flow chart illustrating a procedure after communication ends, in the virtual private line control system according to the embodiment of the present invention.

Next, an operation after communication using the virtual private line ends will be described with reference to FIG. 5 in addition to FIG. 1, FIG. 2 FIG. 3. FIG. 5 is a flow chart illustrating a procedure after the communication ends.

When the communication between the A terminal 30 and the B terminal 40 using the channel 22 ends, a communication end notice is received from a central control unit (not shown) of the A station private branch exchanger 10 (the step S201 of FIG. 5). At this time, the virtual private line channel monitoring function 13 refers to the virtual private line memory 12 to read out the virtual private line connection information 12-3. Then, the virtual private line channel monitoring function 13 updates the virtual private line state information 12-3a for the channel 22 from the "communicating state" to the "empty state" (S202). Also, the virtual private line channel monitoring function 13 updates the channel capture remaining time information 12-3c from the "no setting" to "1 minute" which has been previously set as the channel capture time information 12-3d after communication end (S203). This value can be optionally set. Then, the virtual private line channel monitoring function 13 periodically refers to the virtual private line memory 12 to update the channel capture remaining time information 12-3c. A subtraction value from the 1 minute is set and displayed as the channel capture remaining time information 12-3c.

Figure 6:
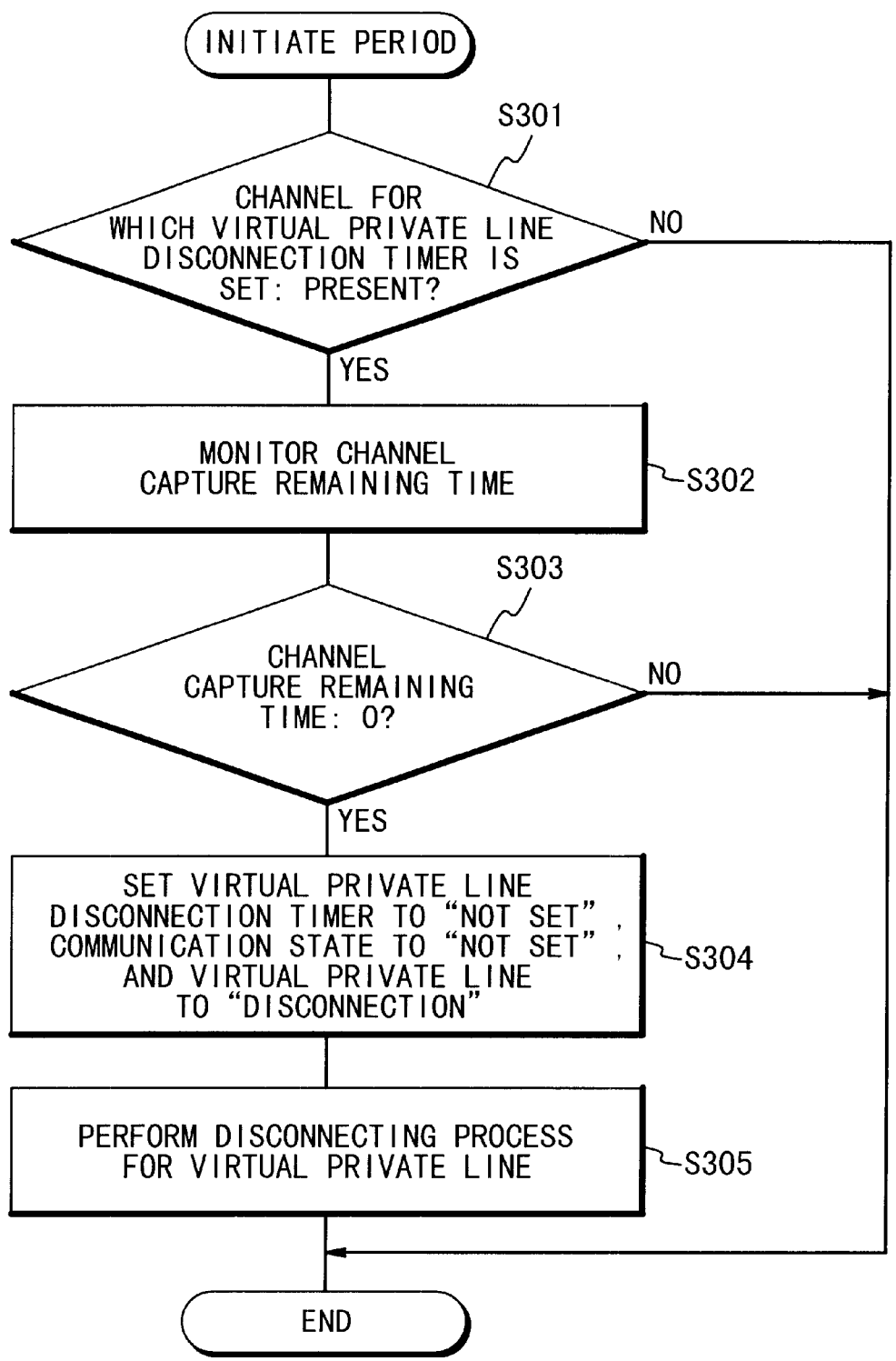
FIG. 6 is a flow chart illustrating a disconnecting procedure of the virtual private line control system according to the embodiment of the present invention.

Next, the disconnecting operation of the virtual private line after communication end will be described with reference to FIG. 6 in addition to FIG. 1, FIG. 2 and FIG. 3. FIG. 6 is a flow chart illustrating the virtual private line disconnecting procedure.

The virtual private line channel monitoring function 13 refers to the virtual private line information memory 12 to read out the virtual private line connection information 12-3. The virtual private line channel monitoring function 13 detects existence or non-existence of any channel which has the channel capture remaining time information 12-3c of "0" (step S301 of FIG. 6). Because the subtraction value of "30 seconds" is displayed as the channel capture remaining time information 12-3c for the channel 22 at present, the virtual private line channel monitoring function 13 monitors when this subtraction value becomes "0" (S302).

When detecting that the channel capture remaining time became "0", the virtual private line channel monitoring function 13 issues a disconnection instruction to the virtual private line connecting and disconnecting function 14. In response to the disconnection instruction, the virtual private line connecting and disconnecting function 14 updates the channel capture remaining time information 12-3c from the "0" to the "no setting", the communication state information 12-3b from the "empty state" to the "no setting", and the virtual private line state information 12-3a from the "con-nected state" to the "disconnected state" (S304). Then, the virtual private line connecting and disconnecting function 14 performs the disconnecting process of the virtual private line (S305).

It should be noted that the initial value of the channel capture time after communication end which has been previously set in the channel capture time information after communication end 12-3d of the virtual private line connection information 12-3 can optionally set to a time which is common to the respective channels or one of different times.

In this way, the channel capture time after communication end for which the capture of the virtual private line after communication end is continued is set, considering the busy hours of traffic. Therefore, the connecting process of the virtual private line for an event generated while the virtual private line continues to be captured becomes unnecessary. As a result, the improvement of the communication efficiency can be attempted.

Also, the virtual private line continues to be captured after the communication ends. Therefore, the communication fee can be restrained in a fee charging system in which the communication fee is calculated based on the connection and disconnection of the virtual private line.

Also, the channel capture time after communication end can be optionally set. Therefore, the present invention can cope with various charging systems.

Moreover, if the channel capture time after communication end is set to a long time, it is possible for the channel to be used as the fixed private line.

As described above, in a private branch exchanger of the present invention, information used to connect a virtual private line is possessed in a virtual private line information memory of each of opposite private branch exchangers. Also, the virtual private line information memory is referred to by a virtual private line identifying function to determine whether the connection of the virtual private line is necessary, when an event is generated. The virtual private line is connected by the virtual private line connecting and disconnecting function, in case that the event is a station line call origination which needs the connection of the virtual private line. The state of the virtual private line channel is periodically monitored by the virtual private line channel monitoring function, and the channel of the virtual private line continues to be captured for an optional time after communication using the connected virtual private line is ended. Also, the channel in the captured state can be used again without new connection of the virtual private line, when a new event is generated while this channel continues to be captured. The channel where communication is ended is disconnected by the virtual private line connecting and disconnecting function, when the new event is not generated while the virtual private line channel continues to be captured. Therefore, the connection of the virtual private line is not performed based on the expected traffic but the connection of the virtual private line is performed when an event of the call origination is generated. That is, the virtual private line are connected for the number of lines determined in accordance with the actual traffic. Therefore, there is not surplus or lack of the virtual private lines corresponding to the difference of the expected traffic and the actual traffic. As a result, the decrease of the line use efficiency and the payment of the wasteful line use fee can be avoided. Also, there is not communication loss due to the lack of the virtual private lines. That is, the use efficiency and the communication efficiency of the virtual private lines can be improved.

Because the virtual private line continued to be captured for a predetermined time after the communication ends, it is not necessary to perform the connecting process of the virtual private line to an event which is generated while the capture of the virtual private line is continued, so that the communication efficiency can be improved when the traffic is high.

Also, the virtual private line continues to be captured after the communication ends, so that the communication charge can be restrained to a charging system in which communication charge is calculated based on the connection or disconnection of the virtual private line.

Also, the channel capture time after the communication end can be optionally set, so that the present invention can cope with various charging systems.

Moreover, by setting a channel capture time after the communication to a long time, it is possible to use the virtual private line as the fixed private line.

What is claimed is:

1. A private branch exchanger which is connected to an ISDN network, comprising:

a virtual private line information table, said table storing information indicating channels corresponding to virtual private lines in units of routes and stores connection state information indicating whether each of said plurality of virtual private lines is in a connected state or in a disconnected state, and communication state information indicating whether a channel corresponding to each of said plurality of virtual private lines is in an empty state or a communication state;

an identifying unit for determining a route in response to an event, said identifying unit referring to said virtual private line information table to determine a specific one of said channels corresponding to said virtual private lines for the determined route, for determining whether a connection of a specific virtual private line corresponding to said specific channel to said ISDN network is established, and for issuing a communication instruction when said specific channel is usable; and a communication unit, said communication unit performing communication using said specific channel in response to said communication instruction;

wherein said identifying unit refers to said virtual private line connection information table to determine whether the connection sate information of each of said virtual private lines for the determined route is in said connected state or in said disconnected state, issues said communication instruction when at least one of said channels of said virtual private lines for the determined route as said specific channel has the communication state information of said empty state, and changes the communication state information for said specific channel from said empty state to said communication state.

2. A private branch exchanger according to claim 1, wherein said identifying unit issues a connection instruction, when all of said channels corresponding to some of said virtual private lines for the determined route have the communication state information of the communication state while ones of said virtual private lines for the determined route other than said some virtual private lines have the connection state information of said disconnected state, and wherein said private branch exchanger further comprises a connection control unit for establishing the connection of one of said virtual private lines for the determined route as said specific virtual private line which has the connection state information of said disconnected state, in response to said connection instruction, and for changing the connection state information for said specific virtual private line to said connected state, and the communication state information for said specific channel corresponding to said specific virtual private line to said communication state.

3. A private branch exchanger according to claim 2, further comprising a monitoring unit for monitoring said channels of said virtual private lines, for changing the communication state information of said specific channel to said empty state when the communication is ended.

4. A private branch exchanger according to claim 3, wherein said virtual private line connection information table further includes a line capture time setting information indicating a time for which each of said virtual private lines should be captured after the communication is ended, and a remaining capture time information indicating a time for which said ach virtual private line should be remained in a captured state, and wherein said monitoring unit sets the line capture time setting information to the remaining capture time information when the communication is ended.

5. A private branch exchanger according to claim 4, wherein said monitoring unit monitors said channels of said virtual private lines for every predetermined time, and updates the remaining capture time information for every channel based on the monitoring result.

6. A private branch exchanger according to claim 5, wherein said monitoring unit issues a disconnection instruction when one of said virtual private lines has the remaining capture time information of 0, and wherein said connection control unit disconnects said one virtual private line having the remaining capture time information of 0.

7. A private branch exchanger which is connected to an ISDN network, comprising:

a virtual private line information table which stores information indicating channels corresponding to virtual private lines in units of routes;

an identifying unit for determining a route in response to an event, for referring to said virtual private line information table based on the determined route to determine a specific one of said channels corresponding to said virtual private lines for the determined route, for determining whether a connection of a specific virtual private line corresponding to said specific channel to an ISDN network is established, and for issuing a communication instruction when said specific channel corresponding to said specific virtual private line is usable; and a communication unit for performing communication using said specific channel corresponding to said specific virtual private line in response to said communication instruction.

8. A method according to claim 7, further comprising the steps of:

issuing a connection instruction, when all of said channels corresponding to some of said virtual private lines for the determined route have the communication state information of the communication state while ones of said virtual private lines for the determined route other than said some virtual private lines have the connection state information of said disconnected state;

establishing the connection of one of said virtual private lines for the determined route as said specific virtual private line which has the connection state information of said disconnected state, in response to said connection instruction; and changing the connection state information to said connected state.

9. A method according to claim 8, further comprising the steps of:

monitoring said channels of said virtual private lines; and changing the communication state information of said specific channel to said empty state when the communication is ended.

10. A method according to claim 9, wherein said virtual private line connection information table further includes a line capture time setting information indicating a time for which each of said virtual private lines should be captured after the communication is ended, and a remaining capture time information indicating a time for which said each virtual private line should be remained in a captured state, and wherein said monitoring step includes setting the line capture time setting information to the remaining capture time information when the communication is ended.

11. A method according to claim 10, wherein said monitoring step includes:

monitoring said channels of said virtual private lines for every predetermined time; and updating the remaining capture time information for every channel based on the monitoring result.

12. A method according to claim 11, further comprising the steps of:

issuing a disconnection instruction when one of said virtual private lines has the remaining capture time information of 0; and disconnecting said one virtual private line having the remaining capture time information of 0.

* * * * *